United States Patent [19]

Angilella et al.

[11] Patent Number: 5,780,846

[45] Date of Patent: Jul. 14, 1998

[54] DEVICE IN PEN FORM WITH MEANS FOR MEASURING A LENGTH

[75] Inventors: Bruno Angilella; Sandro Bocci; Massimo Gallorini, all of Arezzo, Italy

[73] Assignee: A.B.G. S.r.l., Arezzo, Italy

[21] Appl. No.: 553,674

[22] PCT Filed: Jun. 1, 1994

[86] PCT No.: PCT/IT94/00076

§ 371 Date: Apr. 1, 1996

§ 102(e) Date: Apr. 1, 1996

[87] PCT Pub. No.: WO94/29668

PCT Pub. Date: Dec. 22, 1994

[30] Foreign Application Priority Data

Jun. 3, 1993 [IT] Italy .................. FI93A0107

[51] Int. Cl.[6] .................................................. G01B 3/12
[52] U.S. Cl. ......................... 250/227.21; 250/231.14; 33/773; 33/780
[58] Field of Search .................. 250/221, 222.1, 250/231.13, 231.14, 231.16, 231.18, 227.11, 227.21, 229; 33/1 PT, 701, 706, 707, 772, 773, 774, 775, 779, 780; 345/158, 165, 166, 179

[56] References Cited

U.S. PATENT DOCUMENTS

| | | | |
|---|---|---|---|
| 3,911,270 | 10/1975 | Traub | 250/227.11 |
| 4,162,399 | 7/1979 | Hudson | 250/231.14 |
| 5,027,115 | 6/1991 | Sato et al. | 341/13 |
| 5,161,313 | 11/1992 | Rijlaarsadam | 33/773 |
| 5,291,900 | 3/1994 | Löwenstein | 33/773 |
| 5,371,516 | 12/1994 | Toyoda et al. | 345/179 |
| 5,477,622 | 12/1995 | Skalnik | 33/781 |
| 5,485,682 | 1/1996 | Le Breton | 33/773 |
| 5,560,119 | 10/1996 | Le Breton | 33/773 |

OTHER PUBLICATIONS

Anonymous, *Optical Pen Mouse*, Xerox Disclosure Journal, vol. 10, No. 3, May 1985.

*Primary Examiner*—Edward P. Westin
*Assistant Examiner*—John R. Lee
*Attorney, Agent, or Firm*—McGlew and Tuttle

[57] ABSTRACT

A measuring or determining device including a measuring head with a movable body designed to be placed in contact with the object on which the measurement or determination is to be executed. The device includes structure for the generation of electromagnetic radiation and conveying structure to convey the electromagnetic radiation to the movable body. The movable body has a plurality of markings which modulate the electromagnetic radiation in relation to movement of the movable body. Another conveying structure conveys the modulated electromagnetic radiation away from the movable body and to a processing unit which determines the length of the object being measured from the modulated electromagnetic radiation.

23 Claims, 4 Drawing Sheets

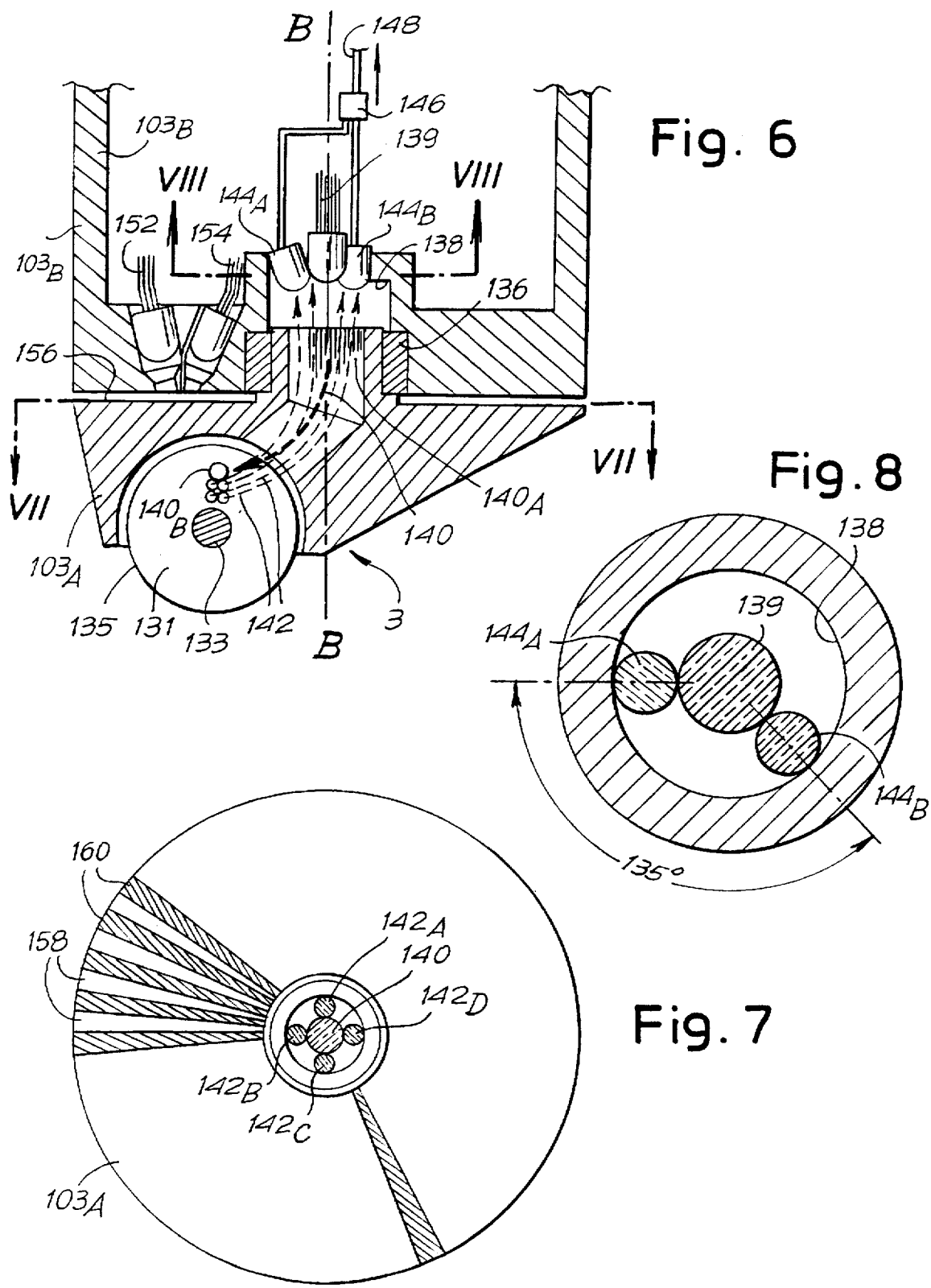

DEVICE IN PEN FORM WITH MEANS FOR MEASURING A LENGTH

FIELD OF THE INVENTION

The invention relates to a device or instrument for measuring lengths, according to the preamble of claim 1.

BACKGROUND OF THE INVENTION

At present there are no effective, precise, inexpensive and easily used instruments for the measurement of lengths or distances to be determined on objects of small dimensions, for example a road map or similar. Furthermore, there are no instruments with the aforesaid characteristics of efficiency, simplicity of use and economy which can be used to rapidly determine the lengths of winding lines or paths, for example the routes of roads shown on a map, profiles of objects of complex form, or other items.

SUMMARY AND OBJECTS OF THE INVENTION

From WO-A-8505175 a device is known, wherein a tracking wheel is arranges at the top of a pen-shaped measuring instrument. The revolutions of the wheel are trasmitted, via a mechanical transmission—and a rotating shaft, to an, interruptor for the generation of a modulated signal. The mechanical transmission is cumbersome and scarcely reliable, because the friction losses negativity affect the measurement. In a different embodiment disclosed in the same document permanent magnets are arranged in the wheel and cooperate with a Hall generator. This embodiment is not effective from a point of view of the costs. Moreover measurements are inaccurate due to possible presence of magnetic fields in the environnement where the device operates.

The invention proposes a new measuring instrument which meets the aforesaid requirements and overcomes the draw backs of the known devices. These objects are achieved with the features of claim 1.

In a first embodiment of the device according to the invention, the movable body is a solid of revolution supported so that it can be rotated about its axis of symmetry; in this case, the detected signal contains data relating to the rotation of the said body. In this embodiment, the device may be used like an ordinary ball-point pen, resting the point on the surface on which the determination or measurement is to be executed. For example, in a typical case of application, the device may be used to determine the length of a path shown on a plan or on a road map. In this case, the point containing the rotating body is rested on the paper, at the start of the path, and is displaced along the path to its end. During the displacement, the body rotates and the markings generate, in the detected signal, a set of pulses which, when sent to a counter, indicate the length of travel.

In a particularly advantageous embodiment, the rotating movable body has an elongated profile in a section containing the axis of rotation. This may be achieved, for example, by the rotation of an ellipse about its minor axis. This shape reduces the contact between the body and the surface on which the measurement is to be made and impedes incorrect use of the device. Moreover, with this configuration an area of the external surface of the rotating body, not coming into contact with the surface where the measurement is being made, is defined. The markings are preferably provided in this area, and are consequently not subject to damage.

In an improved embodiment of the device, the movable body is carried by an angularly movable portion of the head, the said angularly movable portion being rotatable about an axis orthogonal to the axis of rotation of the movable body. In this way a greater ease of following a winding path with the rotating body is obtained. If the angularly movable portion of the head is linked to a detection system to detect the angular movement of the said angularly movable portion about its own axis of rotation, the device becomes a determining instrument which can be used to measure two-dimensional objects, and which may if necessary be interfaced with a computer to replace the conventional graphics tablets.

If the rotating movable body is disposed on an element which is movable linearly and orthogonally with respect to the axis of rotation of the rotating body, the device may be used for a set of further determinations and measurements, for example for the measurement of the profile of a rough or uneven surface. By moving the point of a device made in this way along a straight line marked on a rough surface, for example, it is possible (with suitable software loaded into the electronic part of the device) to calculate the roughness from the linear and rotary displacements of the movable body.

When only the depth of a hole, for example, is to be determined, the movable body may consist of a linearly movable stem instead of a rotating body. In this case the point of the device is rested on the surface where the hole is made, with the stem in alignment with the hole. The extraction path of the stem is determined by the optical means of determination and the corresponding signal indicates, through a counter, the depth of the hole.

In practice, a single device may be provided with a set of different heads, interchangeable by means of a bayonet fitting system for example, for the various applications.

Further advantageous characteristics of the device according to the invention are indicated in the attached subsidiary claims.

The invention will be more clearly understood from the description and the attached drawing, which shows a non-restrictive practical example of the invention. In the drawing,

BRIEF DESCRIPTION OF THE DRAWINGS

FIG. 6 is a section through the point of the device according to the invention in an improved embodiment;

FIGS. 7 and 8 are sections through VII—VII and VIII—VIII in FIG. 6 respectively;

DETAILED DESCRIPTION OF THE PREFERRED EMBODIMENTS

In the embodiment in FIG. 1, the device has the appearance of a pen, indicated in a general way by 1, having a point or head 3, interchangeable if necessary, constituting the reading head, which will be described in the following text. At the opposite end from the head 3 there is disposed a keyboard 5 with a display 7 and a sound diffuser 9.

Figure 1:
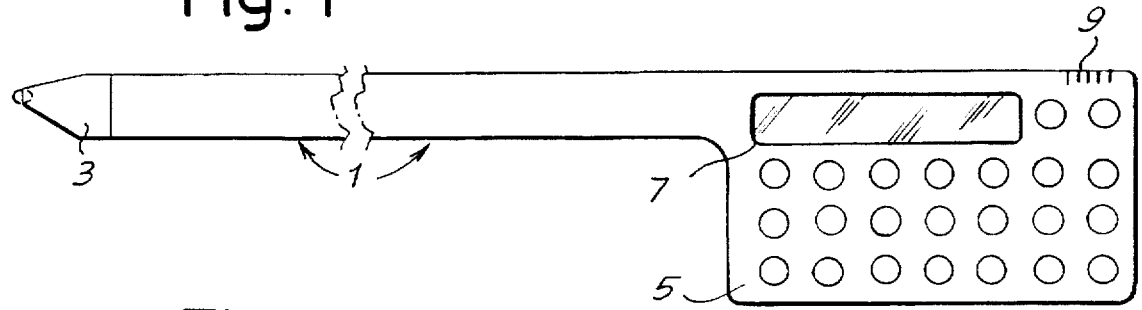
FIG. 1 is an external view of a possible form of the device according to the invention.
Figure 2:
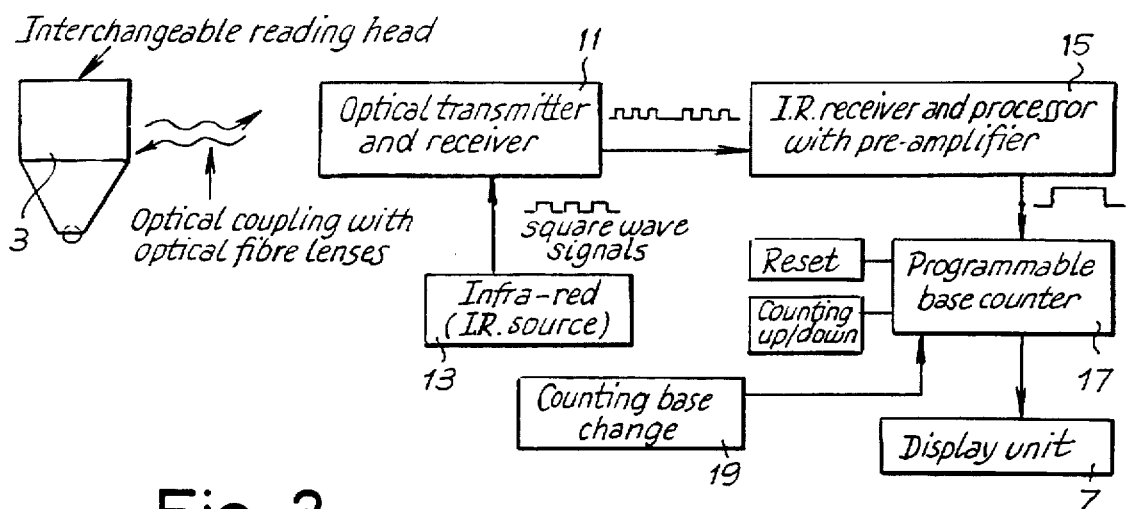
FIG. 2 is a block diagram of the electronic part of the device, in a first embodiment.
Figure 3:
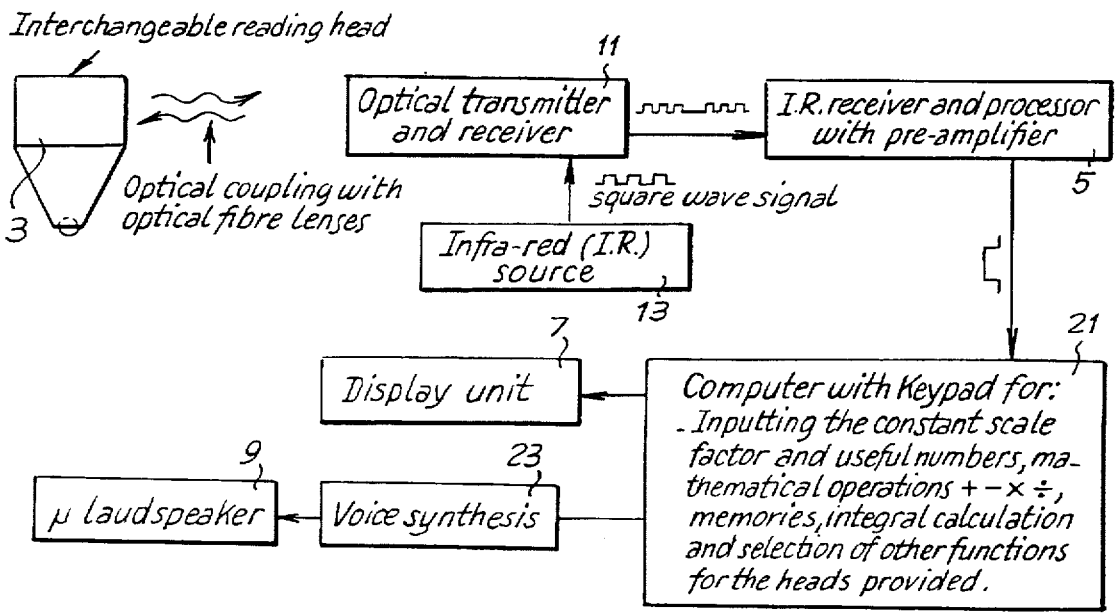
FIG. 3 is a block diagram of the electronic part of the device, in an improved embodiment.

Two possible electronic layouts for the device in FIG. 1 are indicated in FIGS. 2 and 3. In the reading head 3 there is disposed an optical means of determination, which is supplied with a transmitter of electromagnetic radiation, preferably in the infra-red range. An optical receiver receives the electromagnetic signal (at infra-red or other wavelength) returning from the head 3. In the diagram in Fig. 2, 11 indicates the optical transceiver supplied from an infra-red source 13 or similar 15 indicates the receiver and processor of the electrical signal leaving the unit 11, obtained by opto-electronic conversion.

The source may be a solid-state laser or, preferably, a photodiode which emits at the correct wavelength. More particularly, the transmitter may comprise an RC network oscillator with a UJT unijunction transistor type 2N 26 46 or equivalent. The final control element may consist of a PNP transistor type SC 328 or equivalent. The transmitter may be an I.R. photodiode, type LD 271.

The signal emitted from the transmitter is used in the head 3 to determine the movement of a movable body described below. The return signal is detected by a receiver which may comprise, in a possible configuration, a phototransistor type L14G1 as the I.R. detection element, an NPN transistor type BC 107 or equivalent acting as a filter, a high-gain amplifier, for example an NPN transistor type BC 337 or equivalent, and a mono-stable output stage consisting of a 555 integrated circuit (LM 555 or ICM 555). An Optocoupler GaAS integrated circuit, type 4N32, may be used as the decoupling output unit.

The signal leaving the processing unit 15 is sent, as shown in the diagram in FIG. 2, to a programmable-base counter 17 which supplies, through the display unit 7, the value of the measured length. The counting base may be changed as required through the unit 19, to obtain the measurement in the desired unit of measurement on the display.

The diagram in FIG. 3 shows in summary form a more complex circuit, in which the counter 17 is replaced by a micro-computer 21 connected to the display unit 7 and keyboard 5 of the device, and also to a voice synthesis card 23, which may consist of an analogue EPROM, type ISD 1020 AP DAST or other equivalent. The card 23 is connected to the diffuser 9 and provides an acoustic indication of the measurement made. The circuit in FIG. 3 may be simplified by omitting the part concerned with voice synthesis.

Figure 4:
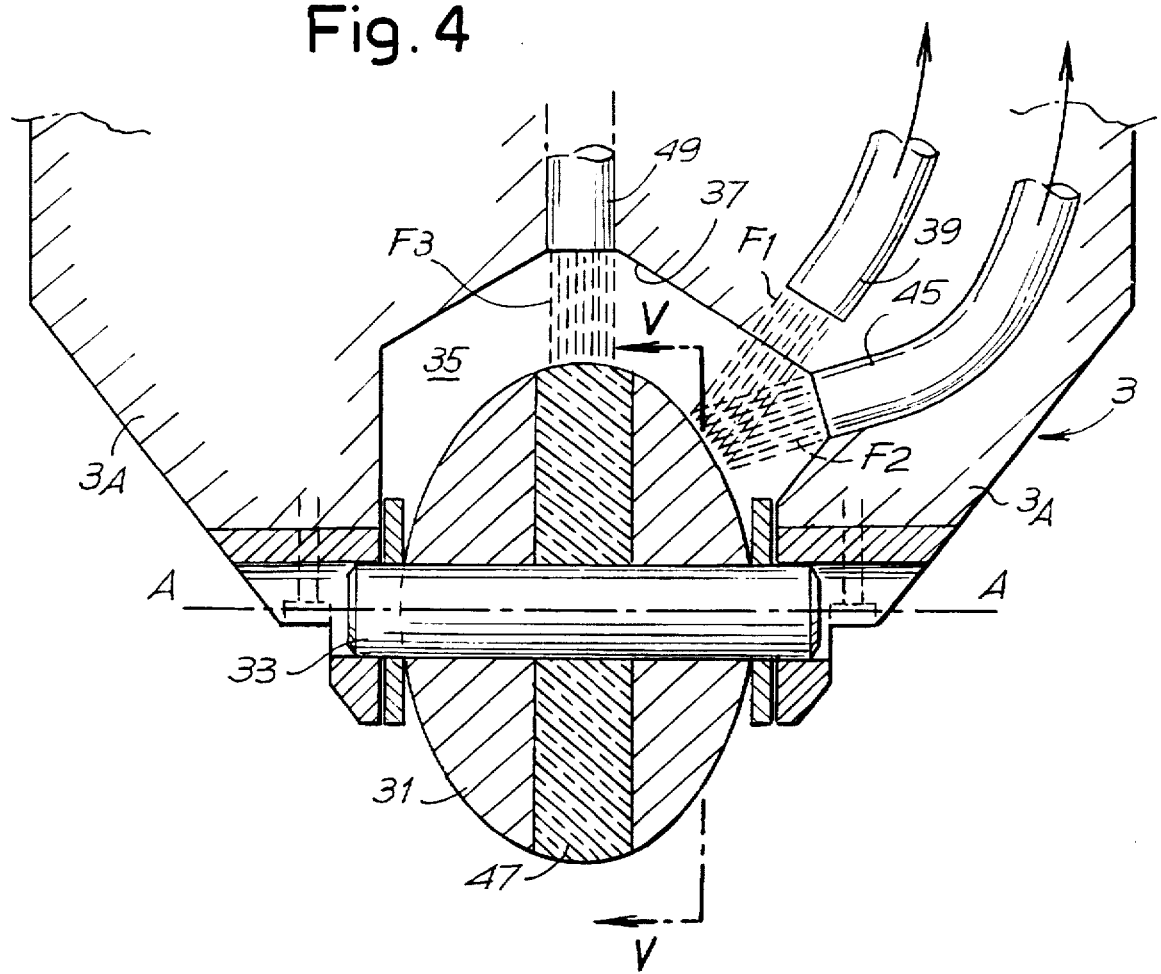
FIG. 4 is a section in a plane including the axis of rotation of the rotating body of the point of the device in a simplified first embodiment.
Figure 5:
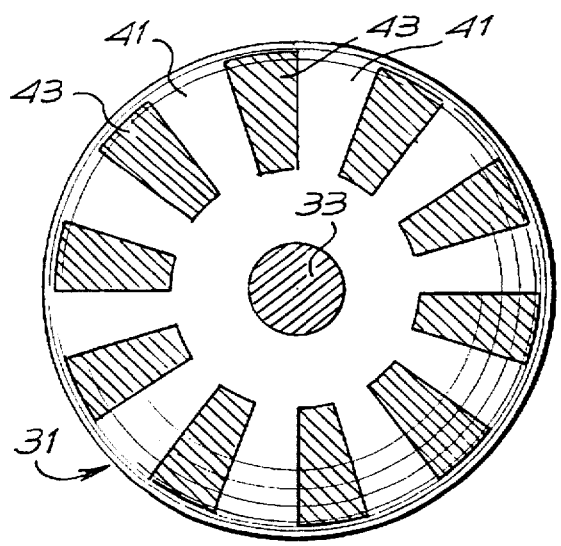
FIG. 5 is a detailed section through V—V in FIG. 4.

FIGS. 4 and 5 show a first embodiment of the head 3. In the point of the head 3 there is disposed a determination body 31 in the form of a solid of revolution. In the specific example, the body 31 is generated by the rotation of an ellipse about an axis of rotation A—A, which is also the axis of a rotation shaft 33 on which the body 31 is fitted. The shaft 33 is supported at its ends by two extensions 3A of the head 3. Between the extensions 3A there is formed a compartment 35 in which rotates the body 31, which projects slightly from the compartment 35 between the extensions. A first optical fibre 39, which carries a beam of infra-red radiation F1 originating from the transmitter 11, opens in an internal delimiting wall 37 of the compartment 35. The beam of parallel radiation F1 strikes the rotating body 31 laterally, in an area in which alternate light and dark strips 41, 43 are provided on the body, as seen in the detailed section in FIG. 5. The beam of radiation F1 strikes this surface of the body F1 and is reflected or not reflected, depending on whether a light surface 41 or dark surface 43 respectively is in front of the fibre 39. The reflected beam, indicated by F2, is conveyed by an output optical fibre 45 to the optical receiver contained in the unit 11 (FIG. 2 or 3). When the body 31 (which projects from the point of the device 1 in a similar way to the ball of a ballpoint pen) is placed on a surface and moved along it, the rotation of the body 31 produces a modulated output optical signal captured by the optical fibre 45, converted into an electrical signal, filtered and amplified by the electronic part 11, 15. The distance travelled by the body 31 during its rotation along a line of any shape is determined from the signal by means of the counter 17. The counter 17 is of the reversible type, and may therefore also allow for reverse movements which lead to a subtraction of pulses.

In the execution of the determination of the length of a line of any form with the head 3 illustrated in FIGS. 4 and 5, care must be taken to keep the axis A—A substantially parallel to the plane in which the determination is being made or (in the case of determinations on curved surfaces) parallel to the plane tangential to the surface at the point of the contact of the rotating body 31. Care must also be taken to steer the body 31 so that the axis A—A is always substantially perpendicular to the straight line tangential to the line followed by the body 31 at the point of contact of the body. This prevents the body 31 from skidding on the surface on which the determination is to be made, which would lead to errors in measurement.

The body 31 has a median discoidal portion 47 made of transparent material. An optical fibre 49 which carries a beam of light for illumination F3 to the median portion 47 is disposed next to this median portion 47. The light radiation from the fibre 49 is diffused through the transparent median portion 47 and illuminates the area around the point of contact between the body 31 and the surface on which the determination is to be made. This facilitates the execution of measurements in poor light conditions.

In an improved embodiment of the head 3, illustrated in FIGS. 6 to 8, in order to facilitate the determination of lengths of lines or profiles of particularly winding form, and to obtain a greater amount of data concerning not only the length of the line, but also its two-dimensional form, the rotating body of the head is made so that it can pivot, in other words rotate additionally about a second axis perpendicular to the axis of symmetry and of rotation of the body.

The head, still indicated by 3, has a rotating body 131 whose shape corresponds to that of the body 31, supported on a rotation shaft 133. The body 131 is housed in a compartment 135 and partially projects from it. The compartment 135 is formed in a portion 103A of the head 3, hinged about an axis B—B to a second portion 103B of the head. The portions 103A and 103B are hinged together by means of a bearing 136 fitted on a tubular extension of the portion 103A.

The portion 103B of the head 3 has a socket 138 in which the bearing 136 is housed, and in which is disposed a transmitter 139, coaxial with the bearing 136, which sends a light signal to a first optical fibre 140 also in alignment with the bearing 136. The fibre 140 is led from the portion 103A of the head and its input end 140A is disposed in alignment with the transmitter 139. The input of the fibre 140 and the transmitter 139 are coaxial with the axis of rotation B—B, so that, when the two portions 103A and 103B of the head 3 rotate with respect to each other, the radiation emitted by the transmitter 139 is still sent into the fibre 140. The opposite end 140B of the fibre 140 opens laterally on to the rotating body 131 and carries the electromagnetic radiation towards the lateral surface of the body, which has light and dark bands as shown in FIG. 5 for the body 31.

The radiation reflected from the rotating body 131 is collected by a system of four optical fibres 142A, 142B, 142C, 142D, whose input ends are disposed adjacent to the output end 140B of the fibre 140, while the output ends are disposed around the input end 140A of the fibre 140. As shown in FIG. 7, the fibres 142A, 142B, 142C, 142D are disposed uniformly at 90° to each other around the central fibre 140.

The signal reflected by the body 131, conveyed by the fibres 142A, 142B, 142C, 142D, is collected by two receivers 144A and 144B disposed in the portion 103B of the head 3. As shown in detail in FIG. 8, the receivers 144A and 144B are disposed parallel to each other with an angular spacing of 135°, and the signals detected by them are combined into a single signal, as shown schematically by the junction 146 and by the line 148 for conveying the combined signal to the electronic processing unit. This disposition, combined with the disposition of the four fibres 142A, 142B, 142C, 142D, makes it possible for the receiver to receive a signal sensitive only to the rotation of the body 131 about the shaft 133, and practically insensitive to the relative rotation between the portions 103A and 103B of the head 3. The angular disposition of the fibres 142A, 142B, 142C, 142D and of the receivers 144A, 144B is such that, when the output end of a fibre 142 is perfectly aligned with one of the receivers 144, no fibre 142 is in front of the other receiver 144, and the signal is collected only by one of the receivers 144. When, owing to a rotation of the portion 103A with respect to the portion 103B, the initially coaxial optical fibre 142 and the receiver 144 begin to move out of alignment, there is a consequent start of an alignment between one of the adjacent fibres 142 and the other receiver 144. The signal which is lost by the gradual loss of alignment of the initially coaxial fibre 142 and receiver 144 is therefore recovered by the start of the alignment of the adjacent fibre and receiver. The two detected signals are then added at 148, where there is a signal which is virtually constant, or at least oscillating with acceptable limits, despite the relative rotation of the portions 103A, 103B.

In short, therefore; the system of optical fibres 139, 140, 142, and receivers 144 provides an output signal which supplies data on the extent of the rotation of the rotating body 131.

To obtain a second set of data on the form of the line or profile measured, the head in FIGS. 6 to 8 has a system for determining the rotation of the portion 103A with respect to the portion 103B. This system comprises a transmitter 152 of electromagnetic radiation, and a receiver 154 for receiving the reflected radiation. The radiation emitted by the transmitter 152 is projected on to a flat surface 156 of the portion 103A on which light and dark bands 158, 160 are provided (see FIG. 7). The alternation of these light and dark bands in front of the transceiver system 152, 154 causes a modulation of the radiation to the receiver 154 and consequently generates a signal containing data on the rotation of the portion 103a about the axis B—B.

This configuration of the head 3, with the second system of reading the rotations about the axis B—B, constitutes in practice a complete system for measuring two-dimensional objects, which may be used with an interface with a data processor, as a mouse, or as a substitute for graphics tablets, making it possible, by means of suitable software, to draw and/or trace any image directly on to the computer screen and to generate a corresponding file of data relating to the said image.

Figure 9:
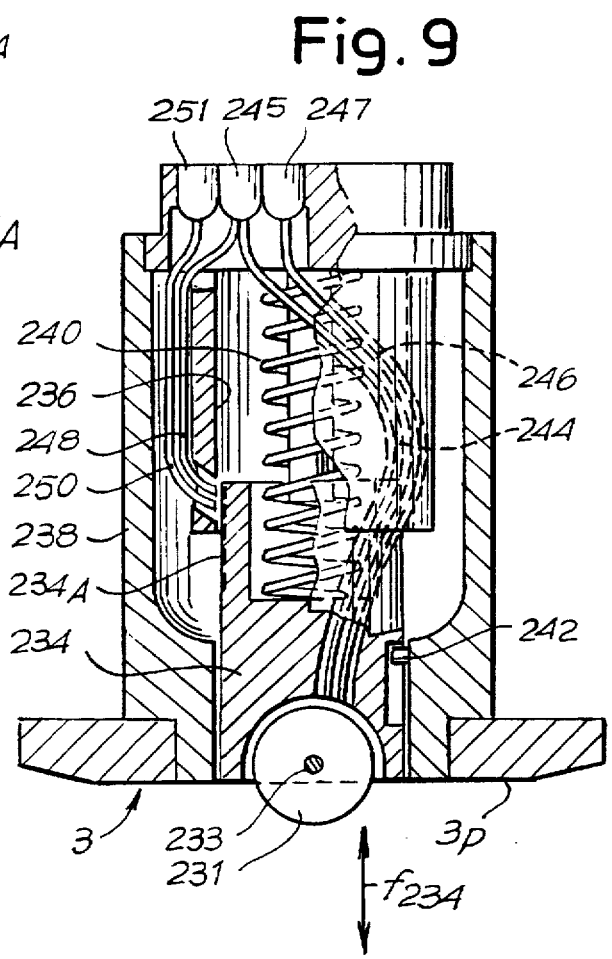
FIG. 9 shows an embodiment in which the head can detect translatory as well as rotary movements of a measuring body.

In certain applications, it may be important to determine not only the rotary movement of a body brought into contact with the profile to be determined, but also a translatory movement in a direction perpendicular to the axis of rotation of the body. FIG. 9 shows, in a highly schematic way, a solution of this type. The rotating body, indicated by 231, is carried by a rotation shaft 233. The shaft 233 is carried by an element 234 which can be translated in the direction of the double arrow f234. For this purpose, the element 234 is housed in a compartment 236 in the body 238 of the head, again indicated in a general way by 3. A compression spring 240 presses the element 234 against a front stop 242. A system of optical fibres 244, 246 carries electromagnetic radiation to the body 231 and collects the signal reflected from a surface portion of the body having light and dark bands as shown in FIG. 5 in the case of the body 31. The optical fibres 244 and 246 emerge from the movable element 234 and enter the body 238 of the head 3, where a transmitter 245 and a receiver 247 are provided.

A disposition of light and dark bands, similar to the disposition provided on the rotating body 231, is provided on a lateral surface 234A of the element 234. A system of optical fibres 248, 250 carries electromagnetic radiation to the surface 234A and collects the reflected signal and sends it to a receiver 251.

With this disposition it is possible to obtain, in addition to the signal containing the data on the rotation of the body 231, a signal containing data on the translation of the element 234 carrying the body 231. This may be useful, for example, for determining the roughness or unevenness of a surface, or even simply to determine the depth of a depression, which may be determined according to the linear displacement of the element 234. The head may be provided with a plate 3P of relatively large diameter which constitutes a support on the surface where the measurement is to be made. The plate 3P enables a zero position of the movable member 231 and of the element 234 to be determined.

Figure 10:
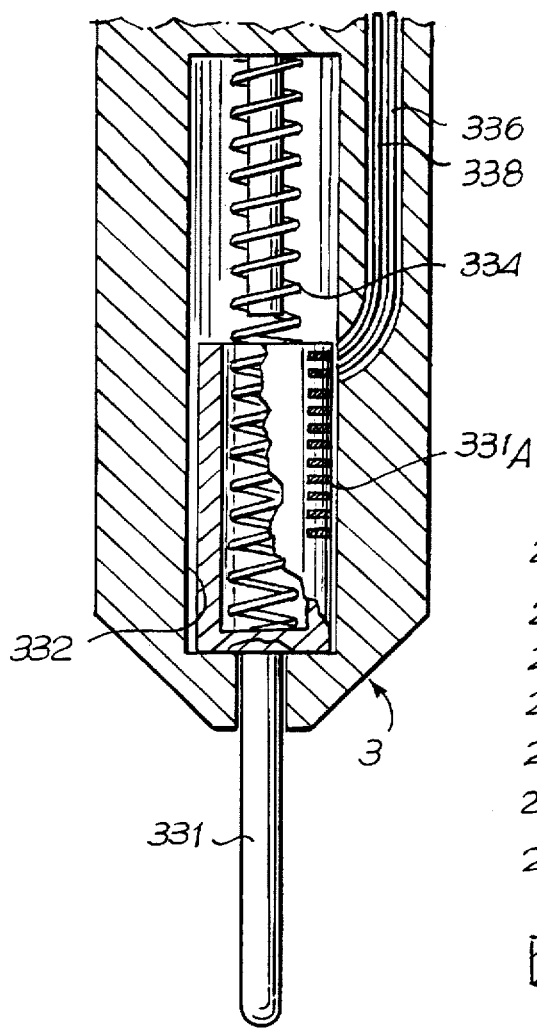
FIG. 10 shows an embodiment suitable for determining translatory movements only of a measuring body.

FIG. 10 shows a simplified embodiment of the device according to the invention, in which only a linear displacement of a measuring body is detected. In this embodiment, the head, again indicated in a general way by 3, has a stem 331 housed so that it is axially slidable in a socket 332. A compression spring 334 presses the stem 331 into an extraction position. Markings consisting of a set of light and dark bands, similar to the bands 41, 43 provided on the body 31 in FIG. 5, are formed on the lateral surface 331A of the stem 331. A system of optical fibres 336, 338 carries the electromagnetic radiation from the transmitter and collects the radiation reflected and modulated by the surface 331A and transmits it to the receiver.

The head in FIG. 10 may be used to determine, for example, the depth of holes in a surface. The stem 331 may be provided with locking members and stops which define its position of maximum extraction, preventing accidental emergence.

Figure 11:
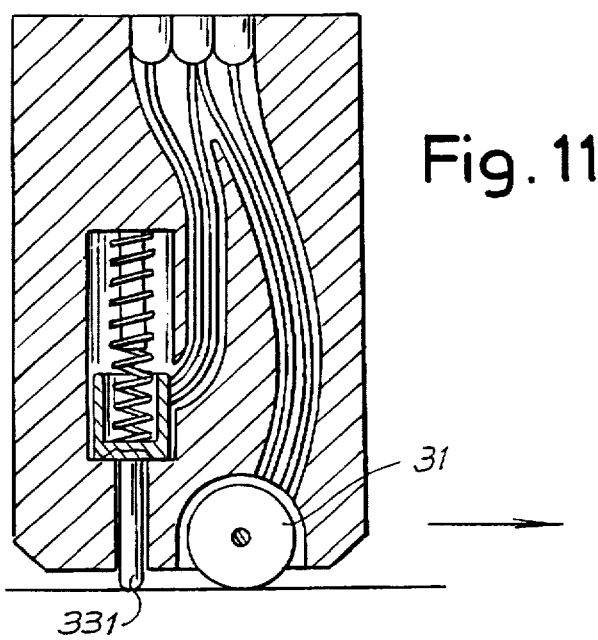
FIG. 11 shows a head with two separate movable bodies, one being capable of translatory movement and one being capable of rotary movement.

FIG. 11 shows a head in which a reading system of the type illustrated in FIG. 4 and a reading system of the type illustrated in FIG. 10 are combined. This head may be used, for example, to measure the roughness of a surface. For this purpose, the head is displaced along a line in such a way that the rotating body determines the distance travelled and the stem which is translated in the vertical direction determines the unevenness.

The various heads illustrated in the figures described above may be used as alternatives on the same device. For this purpose, the device 1 and the head 3 may be provided with bayonet fitting devices or similar, with means of connection which permit the passage of the radiation conveyed by the optical fibres from and to the interior of the device 1, where the electronic components for generating the radiation and for determination and processing are housed.

It is to be understood that the drawing shows only an example provided solely as a practical demonstration of the invention, and that this invention may be varied in its forms and dispositions without departure from the scope of the guiding concept of the invention. Any reference numbers appearing in the enclosed claims have the purpose of facilitating the reading of the claims with reference to the description and to the drawing, and do not limit the scope of protection represented by the claims.

We claim:

1. A measuring device comprising:
    a measuring head;
    a movable body positioned in said measuring head, said movable body being contactable with a length to be measured, motion of said movable body being proportional to the length to be measured, said movable body being a solid of revolution supported rotatably about its axis of symmetry, said movable body being rollable along the length to be measured, said movable body including a central transparent portion;
    electromagnetic radiation means for generation of electromagnetic radiation;
    a first optical fiber conveying said electromagnetic radiation from said electromagnetic radiation means to said movable body;
    a plurality of markings on said movable body, said plurality of markings modulating said electromagnetic radiation from said first optical fiber in relation to motion of said movable body along the length said modulated electromagnetic radiation containing information relating to a rotation of said movable body;
    a second optical fiber conveying modulated electromagnetic radiation away from said movable body;
    processing means receiving said modulated electromagnetic radiation from said second optical fiber and for determining a measurement of the length from said modulated electromagnetic radiation;
    illumination means provided in said measuring head for conveying light radiation to said central transparent portion to illuminate the length to be measured.

2. Device according to claim 1, wherein:
    said movable body has an elongated profile in a section containing an axis of rotation.

3. Device according to claim 1, wherein:
    said movable body has a form of a solid of revolution, said plurality of markings being on a lateral side of said movable body.

4. Measuring device, comprising:
    a measuring head with a fixed portion and an angularly movable portion movable about a measuring head axis;
    a movable body positioned in said angularly movable portion of said measuring head, said movable body being rotatable about a movable body axis, said movable body axis being substantially orthogonal to said measuring head axis, said movable body being contactable with a length to be measured, motion of said movable body being proportional to a length to be measured;
    electromagnetic radiation transmitter means in said fixed portion for transmitting electromagnetic radiation coaxially with said measuring head axis;
    a first optical fiber positioned in said angularly movable portion and for conveying said electromagnetic radiation from said electromagnetic radiation transmitter means to said movable body, an input end of said first optical fiber being coaxial with said measuring head axis;
    a plurality of markings on said movable body, said plurality of markings modulating said electromagnetic radiation from said first optical fiber in relation to motion of said movable body along the length;
    a plurality of second optical fibers conveying modulated electromagnetic radiation away from said movable body, said plurality of second optical fibers having output ends positioned around said input end of said first optical fiber;
    receiver means positioned in said fixed portion for receiving said modulated electromagnetic radiation from said plurality of second optical fibers;
    processing means receiving said modulated electromagnetic radiation from said plurality of receiver means and for determining a measurement of the length from said modulated electromagnetic radiation.

5. Device according to claim 4, wherein:
    said angularly movable portion of said measuring head is linked to a detection means for detecting angular movement of said angularly movable portion of said measuring head about said measuring head axis.

6. Device according to claim 5, wherein:
    said plurality of second optical fibers includes four return optical fibers with output ends angularly spaced by 90 degrees around said input of said first optical fiber;
    said receiver means includes two detecting means angularly spaced by 135 degrees around said transmitter means, said receiver means adding together signals detected by said two detecting means.

7. Device according to claim 4, wherein:
    said receiver means includes two detecting means, and said receiver means adds together signals detected by said two detecting means.

8. Device according to claim 1, wherein:
    said movable body is carried by a linearly movable element.

9. Device according to claim 1, wherein:
    said electromagnetic radiation means generates infra-red radiation.

10. Device according to claim 9, wherein:
    said electromagnetic radiation means is an I.R. photodiode.

11. Device according to claim 1, wherein:
    said processing means includes means for converting said modulated electromagnetic radiation into an electrical signal, said processing means includes means for processing said electrical signal, and said processing means includes a counter means for determining the length followed by said movable body.

12. Device according to claim 11, wherein:
    said counter is a programmable-base counter.

13. Device according to claim 1, wherein:

said processing means includes a micro-computer to perform mathematical operations on measurements made.

14. Device according to claim 4, wherein:

said processing means includes a micro-computer to perform mathematical operations on measurements made.

15. Device according to claim 1, further comprising:

means of connection to an external processor.

16. Device according to claim 4, further comprising:

means of connection to an external processor.

17. Device according to claim 1, further comprising:

voice synthesizing and diffusing means for providing acoustic indication of a measurement or an executed determination.

18. Device according to claim 4, further comprising:

voice synthesizing and diffusing means for providing acoustic indication of a measurement or an executed determination.

19. Device according to claim 1, wherein:

the measuring device is formed as a pen, and said movable body is housed in a tip of said pen.

20. Device according to claim 4, wherein:

the measuring device is formed as a pen, and said movable body is housed in a tip of said pen.

21. Device according to claim 4, wherein:

said electromagnetic radiation transmitter means generates a pre-modulated signal;

said modulated electromagnetic radiation contains said pre-modulated signal.

22. Measuring device, comprising:

a measuring head with a fixed portion and an angularly movable portion movable about a measuring head axis;

a movable body positioned in said angularly movable portion of said measuring head, said movable body being rotatable about a movable body axis, said movable body axis being substantially orthogonal to said measuring head axis, said movable body being contactable with a length to be measured, motion of said movable body being proportional to a length to be measured;

electromagnetic radiation transmitter means in said fixed portion for transmitting electromagnetic radiation coaxially with said measuring head axis;

a first optical fiber positioned in said angularly movable portion and for conveying said electromagnetic radiation from said electromagnetic radiation transmitter means to said movable body, an input end of said first optical fiber being coaxial with said measuring head axis;

a plurality of markings on said movable body, said plurality of markings modulating said electromagnetic radiation from said first optical fiber in relation to motion of said movable body along the length;

a plurality of second optical fibers positioned in said angularly movable portion and conveying modulated electromagnetic radiation away from said movable body, said plurality of second optical fibers having output ends positioned around said input end of said first optical fiber, said output ends of said plurality of second optical fibers rotating about said measuring head axis with respect to said fixed portion when said angularly movable portion rotates about said measuring head axis;

a plurality of receiver means positioned in said fixed portion and arranged around said transmitter means for receiving said modulated electromagnetic radiation from said plurality of second optical fibers;

processing means receiving said modulated electromagnetic radiation from said plurality of receiver means and for determining a measurement of the length from said modulated electromagnetic radiation.

23. Device according to claim 22, wherein:

said output ends of said plurality of second optical fibers and said plurality of receiver means are arranged with respect to each other to maintain a magnitude of electromagnetic radiation from said output ends to said receiver means substantially independent from relative movement between said movable portion and said fixed portion of said measuring head.

* * * * *